(12) United States Patent
Quach et al.

(10) Patent No.: US 9,563,369 B2
(45) Date of Patent: Feb. 7, 2017

(54) FINE-GRAINED BANDWIDTH PROVISIONING IN A MEMORY CONTROLLER

(71) Applicant: MICROSOFT TECHNOLOGY LICENSING, LLC, Redmond, WA (US)

(72) Inventors: Nhon Toai Quach, San Jose, CA (US); Susan Carrie, Mountain View, CA (US); Jeffrey Andrews, Sunnyvale, CA (US); John Sell, Los Altos, CA (US); Kevin Po, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 127 days.

(21) Appl. No.: 14/252,673

(22) Filed: Apr. 14, 2014

(65) Prior Publication Data

US 2015/0293709 A1    Oct. 15, 2015

(51) Int. Cl.
*G06F 3/06* (2006.01)
*G06F 13/16* (2006.01)

(52) U.S. Cl.
CPC .......... *G06F 3/0613* (2013.01); *G06F 3/0631* (2013.01); *G06F 3/0674* (2013.01);
(Continued)

(58) Field of Classification Search
None
See application file for complete search history.

(56) References Cited

U.S. PATENT DOCUMENTS 6,934,820 B2    8/2005    Chauvel et al.
7,191,273 B2 *  3/2007    Weber ......................... 710/244
(Continued)

FOREIGN PATENT DOCUMENTS

EP    2431884 A1    3/2012

OTHER PUBLICATIONS

ISA European Patent Office, International Search Report and Written Opinion Issued in Application No. PCT/US2015/024414, Aug. 4, 2015, WIPO, 10 pages.
(Continued)

*Primary Examiner* — Gary W Cygiel
(74) *Attorney, Agent, or Firm* — Gregg Wisdom; Judy Yee; Micky Minhas (57) ABSTRACT

Systems and methods for applying a fine-grained QoS logic are provided. The system may include a memory controller, the memory controller configured to receive memory access requests from a plurality of masters via a bus fabric. The memory controller determines the priority class of each of the plurality of masters, and further determines the amount of memory data bus bandwidth consumed by each master on the memory data bus. Based on the priority class assigned to each of the masters and the amount of memory data bus bandwidth consumed by each master, the memory controller applies a fine-grained QoS logic to compute a schedule for the memory requests. Based on this schedule, the memory controller converts the memory requests to memory commands, sends the memory commands to a memory device via a memory command bus, and receives a response from the memory device via a memory data bus.

20 Claims, 7 Drawing Sheets

(52) U.S. Cl.
CPC ...... *G06F 13/1605* (2013.01); *G06F 13/1626* (2013.01); *G06F 13/1642* (2013.01); *G06F 13/1668* (2013.01)

(56) References Cited

U.S. PATENT DOCUMENTS

| | | |
|---|---|---|
| 8,271,741 B2 | 9/2012 | Mutlu et al. |
| 8,314,807 B2 | 11/2012 | Biswas et al. |
| 8,452,918 B2 | 5/2013 | Ding |
| 8,452,920 B1 | 5/2013 | Menon et al. |
| 2003/0074519 A1 | 4/2003 | Weber |
| 2007/0113023 A1 | 5/2007 | Arulambalam et al. |
| 2008/0209093 A1 | 8/2008 | Huang et al. |
| 2011/0154352 A1 | 6/2011 | Desota et al. |
| 2013/0246727 A1 | 9/2013 | Hikono |

OTHER PUBLICATIONS

Su, M. et al., "Efficiency-Aware QoS DRAM Scheduler," IEEE International Conference on Networking, Architecture, and Storage, Jul. 9, 2009, 4 pages.

Choi, H. et al., "Memory Access Pattern-Aware DRAM Performance Model for Multi-Core Systems," IEEE International Symposium on Performance Analysis of Systems and Software, Apr. 10, 2011, 10 pages.

Ipek, E. et al., "Self-Optimizing Memory Controllers: A Reinforcement Learning Approach," 35th Annual International Symposium on Computer Architecture, Jun. 21, 2008, 12 pages.

\* cited by examiner

FINE-GRAINED BANDWIDTH PROVISIONING IN A MEMORY CONTROLLER

BACKGROUND

Dynamic random access memory (DRAM) devices are found in a wide range of electronic devices, including computers, smart phones, tablets, game consoles, and televisions. DRAM devices allow the applications running on these electronic devices to temporarily store instructions and data from the non-volatile storage in the device (e.g. FLASH memory or hard drives) before the instructions are executed by the central processing unit (CPU) or other fixed hardware units of the device.

For efficiency reasons, DRAM devices are shared by many different master devices, or intellectual-property (IP) logic blocks that can generate read or write traffic to the DRAM memory devices, in an electronic system. Each master device issues memory requests to the DRAM devices, often via a bus fabric and a memory controller. The memory controller is responsible for scheduling these memory requests and determining how the requests are sent to the DRAM devices. The access latency and, therefore, the effective utilization bandwidth of the DRAM devices depend on how efficiently and effectively the memory controller is able to schedule the requests. When the scheduling is inefficient, excessive bandwidth variations can cause failures in hardware and software applications of the system, such as a frame rate drop in a video game or sound popping due to missing audio frames. A common approach to prevent these failures is to utilize a quality of service (QoS) logic determining how the requests are scheduled and to perform extensive testing to ensure that the application will not fail under as many known bandwidth variation scenarios as possible.

In the prior art, QoS logic solutions primarily relied on two mechanisms: prioritization and rate limiting. A prioritization mechanism favors requests from masters that have been assigned higher priority by the system over requests from masters that have been assigned a lower priority. To prevent the starvation of low priority masters, however, a rate limiting mechanism is used to prevent high priority masters from exceeding an amount of bandwidth allocated to them by the system.

However, these prior QoS logic solutions still allowed for wide variations in the effective bandwidth of the DRAM devices, as perceived by the master devices. As such, software applications developed for electronic systems utilizing prior QoS logic solutions were limited to a specific type of DRAM for which the bandwidth variations has been extensively tested. If a different type of DRAM device, either faster or slower, was used in the system, the QoS logic solution would undergo additional bandwidth variations and the software application would fail to run properly. In the example of game consoles, which typically have long product lifecycles, this drawback prevents console makers from switching to faster, cheaper types of DRAM during a latter period of the lifecycle of a game console for fear that previously developed games will not run properly on the updated hardware.

SUMMARY

Systems and methods for applying a fine-grained QoS logic are provided. The system may include a memory controller, the memory controller configured to receive memory access requests from a plurality of masters via a bus fabric. The memory controller determines the priority class of each of the plurality of masters, and further determines the amount of data bus bandwidth consumed by each master on the data bus. Based on the priority class assigned to each of the masters and the amount of data bus bandwidth consumed by each master, the memory controller applies a fine-grained QoS logic to compute a schedule for the memory access requests. Based on this schedule, the memory controller converts the memory access requests to memory access commands, sends these memory access commands to a memory access device via a memory command bus, and receives a response from the memory device via a memory data bus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Systems and methods for controlling access to memory, such as dynamic random access memory (DRAM), are disclosed herein, to address the challenges described above.

In modern electronic systems, it is typical for the CPU and other hardware devices, often referred to as master devices, to issue requests to the DRAM of the system via a memory controller and various buses. The memory controller may use various queues and a multiplexer to schedule the requests issued from the master devices and may apply a quality of service (QoS) logic in order to determine the most efficient manner to execute the requests.

Figure 1:
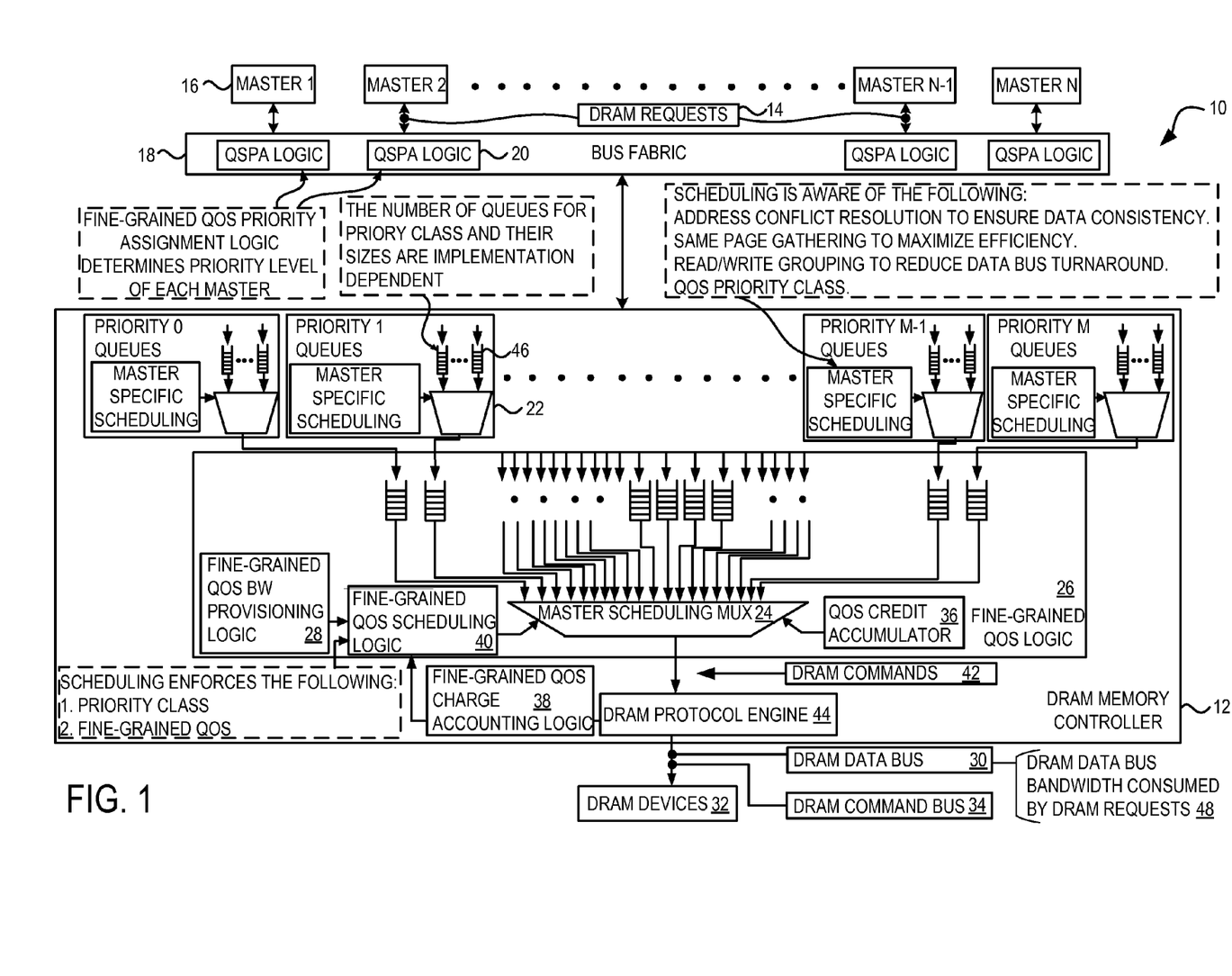
FIG. 1 is a schematic diagram of a system configured to execute a fine-grained QoS logic to provision the bandwidth of a DRAM data bus, according to one embodiment.

FIG. 1 depicts an embodiment of a system 10 including a memory controller 12 that is configured to receive dynamic random access memory (DRAM) requests 14 from a plurality of masters 16 via a bus fabric 18, determine a priority level assigned with each of the plurality of masters 16, determine an amount of DRAM data bus bandwidth consumed 48 by each master on a DRAM data bus 30, apply a fine-grained QoS logic 26 to compute a schedule for the DRAM requests 14 based on a priority level assigned to each master 16 and an amount of bandwidth consumed 48 by each master 16, and, based on the schedule, convert the DRAM request 14 to DRAM commands 42, send the DRAM commands 42 to at least one DRAM device 32 via a DRAM command bus 34, and receive a response from the DRAM device 32 via a DRAM data bus 30. The masters 16 may be, for example, the CPU and GPU of a video game console and may be requesting to read or write, on the DRAM devices 32, data related to a video game currently being played by a user of the console.

Figure 3:
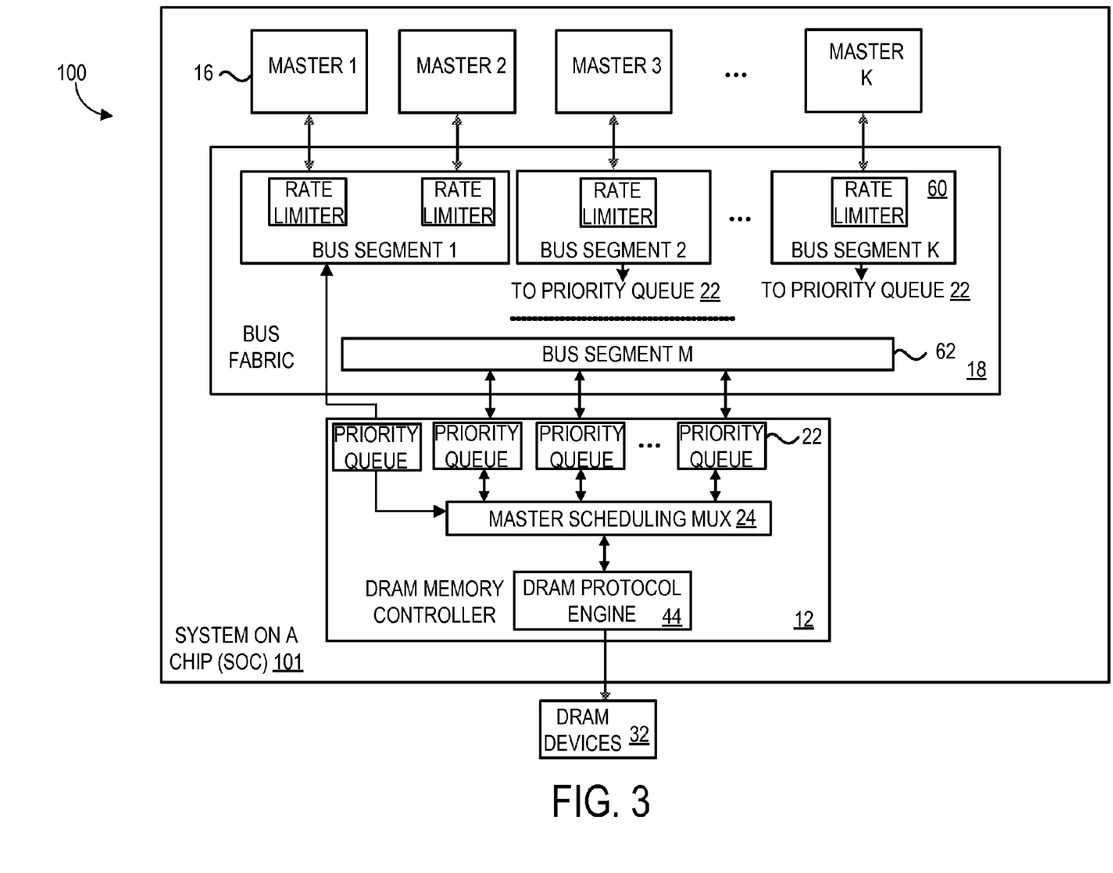
FIG. 3 is a schematic diagram of a second embodiment of a system configured to execute a fine-grained QoS logic to provision the bandwidth of a DRAM data bus, in which the masters, bus fabric, and DRAM memory controller are formed as a system-on-a-chip.

When requests 14 are issued by a master 16, the system 10 is configured to transmit the requests through the bus fabric 18. The bus fabric is shown in FIG. 1 as a single fabric arranged between the master 16 and the memory controller 12. However, the bus fabric 18 may also comprise as many bus segments as needed to accommodate all the traffic patterns from the masters 16. FIG. 3 illustrates a second embodiment of the system 10, in which the bus fabric is divided into a plurality of bus segments, including segments with rate limiters 60 and segments without rate limiters 62. Turning back to FIG. 1, the bus fabric 18 may be configured to apply a QoS Priority Assignment Logic 20 to assign a priority level to each of the requests 14 based on a priority level assigned to each of the masters 16. Priority levels may be assigned to each of the masters 16 by software applications running on the system 10. Such an assignment may occur, for example, once per boot up of system 10, on an application border when an application is run on system 10 or on each boot up of a virtualized environment on system 10. The masters 16 may include real-time master devices that may be sensitive to bandwidth variation and that may cause a degraded user experience if bandwidth variation becomes excessive. Such real time master devices may be assigned higher priority levels by the by software applications running on the system 10.

After assigning a priority level to each of the requests 14, the bus fabric 18 may be configured to send the request to the memory controller 12. The memory controller 12 may be further configured to assign each DRAM request 14 to one of a plurality of priority queues 22 based on the priority level, and schedule the DRAM requests 14 in each of the plurality of priority queues 22.

To understand the scheduling parameters that may be used by the priority queues 22 to schedule the requests 14, it is helpful to briefly turn to a discussion of the structure and operation of the DRAM devices 32. The DRAM devices 32 may be configured as arrays of "pages," each page containing a number of memory cells (for example, between 8 kilobits and 16 kilobits per page). The pages may be arranged in rows and columns, and further grouped into banks, each bank containing tens of thousands of pages. A page in the DRAM devices 32 may be either open or closed depending on the whether or not it has been accessed by one of the requests 14. System 10 may be configured such that all pages in all banks of the DRAM devices 32 are closed when system 10 is booted up. When one of the DRAM requests 14 is issued requesting access to a closed page in a bank of the DRAM device 32, the request 14 will initially result in a "page miss" and the memory controller 12 will have to perform a "page open operation" to open the targeted page. While the page open operation is occurring the memory controller 12 will not be able to access the content of any other pages in that bank, since the memory controller 12 is typically configured to allow only one open page in each bank at any one time. As a result, during the page open operation, the memory controller 12 may be configured to seek requests 14 targeting pages in other banks.

When a page is open, subsequent requests 14 to access the same page will initially result in a "page hit" within the memory controller 12 and thus can be completed without performing a page open operation. Thus, memory controller 12 may be configured to perform "same page gathering," wherein requests 14 requesting access to the same page are grouped together to reduce the need for page open operations.

When the a subsequent request targets a different page in the same bank as the last issued request (i.e. the last request completed prior to current request), a so-called "page conflict" occurs, and the memory controller 12 must close the currently open page with a "page close operation" before opening the page targeted by the request 14 with a page open operation. Both page open operations and page close operations consume bandwidth on the DRAM data bus 30. Bandwidth consumption on the DRAM data bus 30 may be measured as the number of bus cycles required to complete a given request 14. The number of bus cycles, and therefore the amount of bandwidth consumed 48, on the DRAM data bus 30 per operation is determined by the timing parameters of the specific type of memory used for DRAM devices 32. However, irrespective of the type of memory used, bandwidth consumption 48 on the DRAM data bus 30 varies depending on whether the request 14 has a page hit, a page miss, or a page conflict.

In addition, DRAM requests 14 may be either read requests or write requests. If a request 14 is a read request, the memory controller 12 is configured to perform a "read operation," sending a "read command" on the DRAM command bus 34 and receiving "read data" on the DRAM data bus 30 after a predetermined number of clock cycles. If the request 14 is a write request, the memory controller 12 is configured to perform a write operation, sending a write command on the DRAM command bus 34 and sending the write data on the data bus 30 after waiting for a predetermined number of clock cycles. However, when request 14 is a write request and the last issued request was a read request, the memory controller 12 is configured to perform a "read to write bus turnaround" to avoid a data hazard (i.e., a risk of mishandling the data) resulting from a conflict in the use of the data bus 30. For example, if read data is still returning on the DRAM data bus 30 when a write operation begins, a bus collision between the outgoing write data and the incoming read data could occur. To avoid such occurrences during a write operation, prior to beginning the write operation, the memory controller 12 may be configured to confirm that no previous read data is being returned on the DRAM data bus 30. When there is a conflict, the memory controller 12 may be configured to perform a read to write bus turnaround, in which the write command is delayed to allow the read data to be returned on the data bus 30 before sending the write data to the DRAM device 32. Similarly, when the request 14 is a read request and the last issued request was a write request, the memory controller 12 is configured to perform a "write to read bus turnaround," delaying the read command to allow the write data to be written into the memory of the DRAM device 32 before the read data are returned from the DRAM device 32 to the memory controller 12 via the DRAM data bus 30. Both read to write bus turnaround and write to read bus turnaround operations consume a number of bus cycles, and therefore an amount of bandwidth, on the DRAM data bus 30. Thus, the amount of bandwidth consumed 48 on the DRAM data bus 30 required to complete a request 14 may depend on both the request type (i.e. read or write) of the current request 14 being issued by the memory controller 12 to the DRAM devices 32 and the request type of last issued request 14. To minimize this bandwidth consumption, the memory controller 12 may be configured to perform "read/write grouping," in which requests 14 are grouped based on the request type to reduce the need for read to write bus turnaround and write to read bus turnaround operations.

Furthermore, if a request 14 is a read request, the master 16 issuing the request 14 may be requesting data that has not yet been written on the DRAM devices 32. To avoid issuing the request 14 before the data has been written, the page address of the request 14 must be compared to the page addresses of all write requests 14 in all priority queues 22. This process is referred to as address conflict resolution, and may be used to ensure data consistency. If there is a match, the read request 14 in question must wait until all earlier write requests 14 are completed.

Table 1, shown below, describes examples of the bandwidth costs for some common cases of a given request 14 based on the location of the page requested, request type and the state of the DRAM device 32 at the time when the request 14 is made (i.e. request type previously completed).

to close an open page as described above; tW2R is the cost, expressed as the number of cycles of the DRAM data bus 30 required to turn the DRAM data bus 30 for a read operation following a write operation by performing a write to read bus turnaround as described above; and tR2W is the cost, expressed as the number of cycles of the DRAM data bus 30 required to turn the DRAM data bus 30 for a write operation following a read by performing a read to write bus operation as described above. It is important to note that while different DRAM memory devices (e.g., DDR3, LPDDR3, or GDDR3) may use different names for these parameters, the concepts described in the present disclosure apply to any of the DRAM devices described above. Note that the refresh operations, which will be elaborated on in the following paragraph, were not included in Table 1 as they are considered the overhead cost of the DRAM device 32, not those of the master 16.

Table 1 represents one possible embodiment of the system 10. The system 10 is not limited to the parameters listed in table 1 and, depending on the final objectives of the QoS scheme, other tables may be constructed according to the principles described herein to achieve the desired results.

The memory controller 12 may be configured to schedule the DRAM requests 14 in the priority queues 22 in accor-

TABLE 1

Bandwidth Cost per Request in terms of Bus Cycles

| Previous DRAM Request | Current DRAM Request | | | | | |
|---|---|---|---|---|---|---|
| | Same page | | Different page | | | |
| | | | Same Bank | | Different Bank | |
| | Read | Write | Read | Write | Read | Write |
| Read | BL/2 | BL/2 + tR2W | tPRE + tACT + BL/2 | tR2W + tPRE + tACT + BL/2 | If a different page from the targeted one is open: tPRE + tACT + BL/2<br>If the targeted page is closed: tACT + BL/2<br>If the targeted page is open: BL/2 | If a different page from the targeted one is open: tR2W + tPRE + tACT + BL/2<br>If the targeted page is closed: tACT + BL/s<br>If the targeted page is open: BL/2 |
| Write | BL/2 + tW2R | BL/2 | tW2R + tPRE + tACT + BL/2 | tPRE + tACT + BL/2 | If a different page from the targeted one is open: tW2R + tPRE + tACT + BL/2.<br>If the targeted page is closed: tACT + BL/2<br>If the targeted page is open: BL/2 | If the different page from the targeted one is open: tPRE + tACT + BL/2<br>If the targeted page is closed: tACT + BL/2<br>If the targeted page is open: BL/2 |

In Table 1 above, the variable BL indicates the Burst Length of the DRAM device 32; BL/2 is the duration of time the DRAM data bus 30 will be busy carrying the data read from or written to the DRAM device 32 for any double data rate memory devices such as DDRn, low-power DDRn (LPDDRn), or graphics DDRn (GDDRn); the variable tACT is the bandwidth cost of opening a page, which is the time it takes to activate a page as described above; tPRE is the bandwidth cost of closing a page, which is the time it takes dance with the above methods so as to minimize the bandwidth consumption on the DRAM data bus 30. Each priority queue 22 may be composed of a plurality of queues 46. The number and size of the priority queues 22 for each priority level, as well as the number of queues 46 within each of the priority queues 22, may vary depending on the implementation. In FIG. 1, N master devices 16 and M priority queues 22 are depicted. The queues 46 within each of priority queues 22 for a given priority level may comprise at least one read queue and one write queue. The memory controller 12 may be configured to schedule the requests 14 within each of the plurality of priority queues 22. The schedule may be master dependent and based on parameters such as address conflict resolution, same page gathering, read/write grouping, and the priority level assigned to each of the requests 14.

The memory controller 12 may be further configured to send the DRAM requests 14 to a master scheduling multiplexer 24, periodically monitor an unused portion of bandwidth allocated to each master 16, and throttle DRAM requests 14 at the memory controller 12 if an unused portion of the bandwidth drops below a predetermined level. The memory controller 12 may be configured to send the DRAM requests 14 to the master scheduling multiplexer 24 after selecting the best candidate requests 14 from the priority queues 22, based on the scheduling parameters described above.

The master scheduling multiplexer 24 may be configured to apply the fine-grained QoS logic 26, including a fine-grained QoS bandwidth provisioning logic 28 configured to allocate a predetermined amount of bandwidth in the DRAM data bus 30 to each of the plurality of masters 16. The fine-grained QoS logic 26 may be configured to divide the bandwidth of the DRAM device 32 into two categories, useful QoS bandwidth and overhead bandwidth. Overhead bandwidth may be bandwidth consumed by the memory controller 12 to ensure correct operation of the DRAM devices 32 and may include bandwidth consumed for refresh operations. During a refresh operation, the memory controller 12 is configured to suspend all read operations and write operations to all banks of the DRAM device 32, close all open pages, and issue refresh commands to refresh the content of all the pages in the DRAM devices 32. After the refresh operation is complete, the memory controller 12 is configured to resume read and write operations. Useful QoS bandwidth may include the bandwidth consumed 48 by the masters 16 to perform operations such as read and write operations on the DRAM devices 32. The memory controller 12 may be configured to assign a predetermined amount of the useful QoS bandwidth to the masters 16 through the fine-grained QoS bandwidth provisioning logic 28. The amount of bandwidth allocated to each of the masters 16 may be determined by software applications running on the system 10. Such an assignment may occur, for example, once per boot up of the system 10, on an application border when an application is run on system 10, or on each boot up of a virtualized environment on system 10.

The memory controller 12 may be configured to determine the unused portion of bandwidth for each master 16 by computing the bandwidth consumed 48 by each master 16 on the DRAM data bus 30 for each request 14 and subtracting the bandwidth consumed 48 from the amount of useful QoS bandwidth allocated to each master 16 by the fine-grained QoS bandwidth provisioning logic 28. The memory controller 12 may be configured to measure the bandwidth consumed 48 by a request 14 in terms of the number of bus cycles of the DRAM data bus 30 that are required to complete the request 14. The number of bus cycles required to complete a request 14 may vary depending on various characteristics of the request 14, such as request type (i.e. read or write), whether the page targeted by the request 14 in the DRAM device 32 is currently open or closed, and whether or not the page targeted by request 14 is located in the same bank as the page targeted by the last issued request.

The fine-grained QoS logic 26 of the memory controller 12 may be further configured to include a QoS credit accumulator 36. The QoS credit accumulator 36 may be configured to incrementally accumulate credits for each of the plurality of masters 16. The rate of accumulation may correspond to the bandwidth allocated to the master by the fine-grained QoS bandwidth provisioning logic 28, and the total credits for each master 16 may not exceed a predetermined maximum QoS credit value. For example, if a given master 16 is allocated 1 gigabyte per second of bandwidth in the DRAM data bus 30, and the DRAM data bus 30 is running at a clock frequency of 200 MHz (200,000,000 cycles per second), then the QoS credit accumulator 36 would accumulate 5 bytes worth of credit per cycle designated for the master 16 in question. If the master 16 were to issue a request 14, the bandwidth consumed 48 by the request 14 would be subtracted from the credits in the QoS credit accumulator 36 corresponding to the master 16. If the master 16 issues no requests 14, the QoS credit accumulator 36 would continue to accumulate credit at a rate of 5 bytes per cycle until the total credits for the master 16 reached the maximum QoS credit value. The system 10 may be configured to allow a software application running on the system 10 to determine the maximum QoS credit value.

Figure 2:
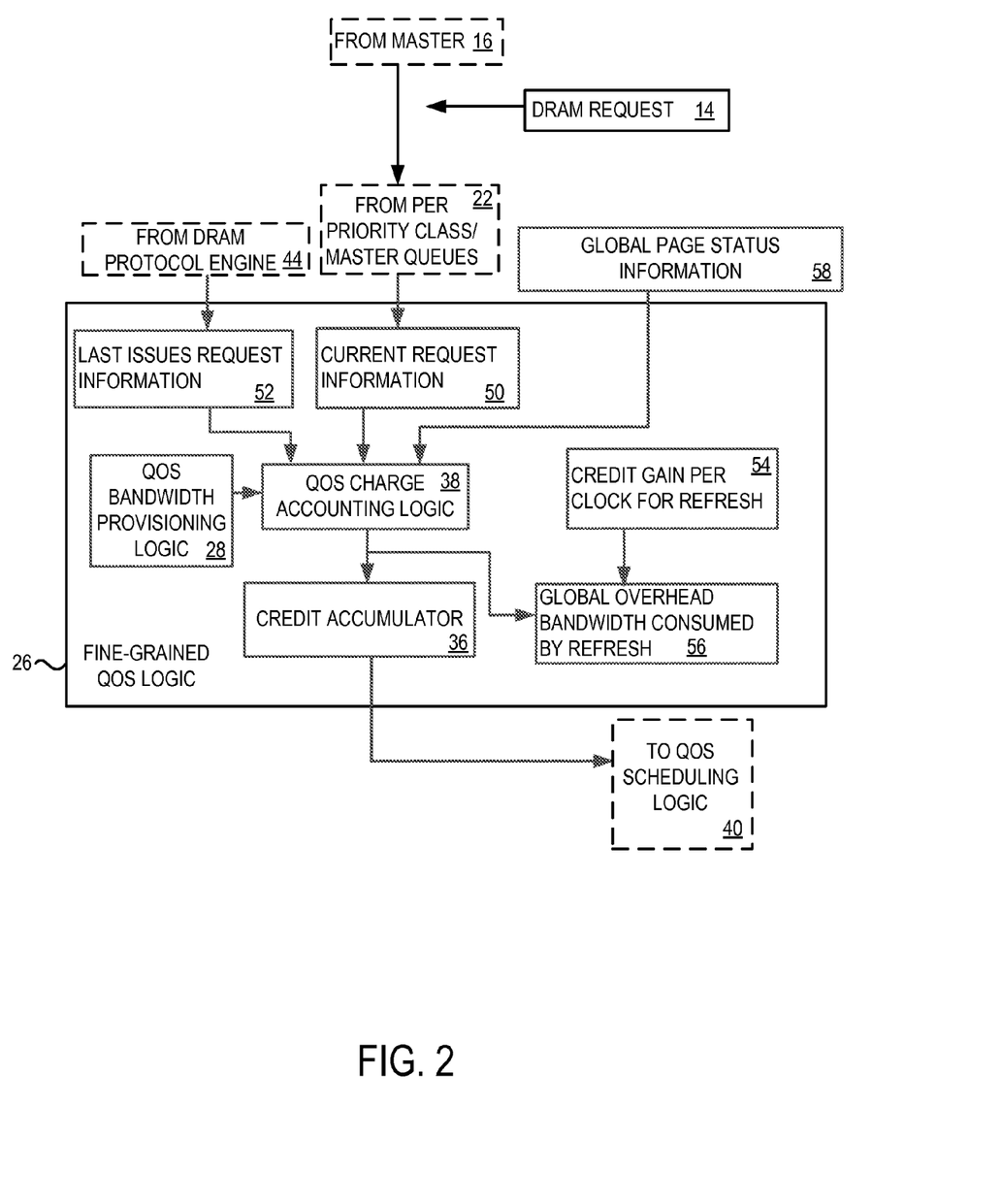
FIG. 2 is a schematic diagram of the fine-grained QoS logic of the system of FIG. 1, which may be configured to compute an amount of bandwidth consumed by a DRAM request on a DRAM data bus.

The fine-grained QoS logic 26 may be configured to further include a fine-grained QoS charge accounting logic 38, which may be configured to calculate the bandwidth 48 on the DRAM data bus consumed by each DRAM memory request, and compute a credit balance for each master by subtracting the calculated bandwidth from the credits in the QoS credit accumulator corresponding to each master. FIG. 2 shows a schematic diagram of the processes that may be included in the operation of the fine-grained QoS charge accounting logic 38. As shown, the fine-grained QoS charge accounting logic 38 may be configured to receive, from the priority queues 22, current request information 50 regarding the currently queued requests. The current request information 50 may include the request type (i.e. read or write) of the requests 14, as well as the page address and the bank of the page targeted by the requests 14 currently being sent from the priority queues 22 to the master scheduling multiplexer 24. In addition, the fine-grained QoS charge accounting logic 38 may be further configured to receive last issued request information 52 from a DRAM protocol engine 44. The last issued request information 54 may include the request type (i.e. read or write) of the request 14, as well as the page address and the bank of the page targeted by the request 14 that was last sent to the DRAM devices 32. The last issued request information 54 may further include whether the request 14 last issued to the DRAM devices 32 had a page hit, page miss, or page conflict. The fine-grained QoS charge accounting logic 38 may be further configured to use one or both of the current request information 50 and last issued request information 54 to calculate the bandwidth consumed 48 on the DRAM data bus 30 by a request 14 and subtract that amount from the credits in the QoS credit accumulator 36 corresponding to the master 16 that issued the request 14. The fine-grained QoS charge accounting logic 38 may also be configured to use global page status information 58 received from a DRAM protocol engine 44. The global page status information 58 may include the current status of all pages in the DRAM devices 32. The fine-grained QoS charge accounting logic 38 may use global page status information 58 to determine which requests 14 would have a page hit, a page miss, or a page conflict if issued to the DRAM devices 32. The fine-grained QoS charge accounting logic 38 may be further configured to consider the global overhead bandwidth consumed by refresh 56 and the credit gain per clock cycle for refresh 54 before subtracting the bandwidth consumed 48 by the request 14 from the total credits in the QoS credit accumulator 36. Because the system 10 may be configured to allocate only useful QoS bandwidth to masters 16, the QoS charge accounting logic 38 may be configured to provide a credit gain per clock cycle to compensate for the bandwidth consumed by refresh operations, or other forms of overhead bandwidth consumption. After the QoS charge accounting logic 38 has subtracted the bandwidth consumed 48 by the last issued request 14, the fine-grained QoS credit accumulator 36 may be further configured to send the current balance in the QoS credit accumulator 36 for each of the masters 16 to a QoS scheduling logic 40, discussed below.

Turning back to FIG. 1, the fine-grained QoS logic 26 may be further configured to include a fine-grained QoS scheduling logic 40, configured to schedule the DRAM requests 14 based on the priority class of each request, and to throttle the DRAM requests 14 if the credit balance in the QoS credit accumulator 36 for the master 16 issuing the DRAM request 14 is below a predetermined minimum QoS credit value. The fine-grained QoS scheduling logic 40 may be configured to receive a current credit balance for each of the masters 16 corresponding to each of the queued requests 14 from the fine-grained QoS charge accounting logic 38. The fine-grained QoS scheduling logic 40 may be further configured to select the request 14 with the highest priority level and a credit balance above the predetermined minimum QoS credit value. If a request 14 has a credit balance below the minimum QoS credit value, the fine-grained QoS scheduling logic 40 may be configured to throttle the request 14, irrespective of the priority level of the request 14. If multiple requests 14 have the same priority level and credit balances above the minimum QoS credit value, scheduling may be performed in a round-robin manner, or according to another suitable default scheduling algorithm. If all available requests 14 have credit balances below the minimum QoS credit value, the request 14 with the highest priority level may be selected. The system 10 may be configured to allow a software application running on the system 10 to determine the minimum QoS credit value.

The memory controller 12 may be further configured to include a DRAM protocol engine 44 configured to receive DRAM requests 14 from the master scheduling multiplexer 24, send DRAM requests 14 to the DRAM devices 32 via a DRAM command bus 34. The DRAM protocol engine 44 may be configured to receive the DRAM request 14 that have been selected by the master scheduling multiplexer 24 based on the schedule created by the fine-grained QoS logic 26. The memory controller 12 may be further configured to convert the DRAM requests 14 to DRAM commands 42 prior to sending the DRAM requests 14 to the DRAM protocol engine 44. The DRAM protocol engine 44 may be further configured to receive a response from the DRAM devices 32 and send information about the last issued request 14 to the fine-grained QoS charge accounting logic 38. Optionally, the protocol engine 44 may be configured to receive a response from the DRAM devices 32, which may be in the form of an interrupt to inform the memory controller 12 that the DRAM request 14 was completed successfully. The protocol engine 44 may be further configured to send the last issued request information 54, as discussed shown in FIG. 2, to the fine-grained QoS charge accounting logic 38. This information may include the request type (i.e. read or write) of the request 14, the page address and bank of the page targeted by the request 14, and whether the request 14 had a page hit, a page miss, or a page conflict.

FIG. 3 illustrates a second embodiment of a system 100 configured to execute a fine-grained QoS logic to provision the bandwidth of a DRAM data bus. System 100 includes a system-on-a-chip (SoC) 101, on which are formed the masters 16, bus fabric 18, and DRAM memory controller 12, which in turn communicates with DRAM devices 32. The DRAM devices 32 may be formed on the SoC 101 or as independent devices. The various components formed on the system on chip function similarly as described above, and will not be re-described for the sake of brevity. As described above, in this embodiment the bus fabric is divided into a plurality of bus segments, including segments with rate limiters 60 and segments without rate limiters 62. It will be appreciated that the system on chip 101 utilizes the rate limiters 62 to ensure a minimum fixed amount of bandwidth on the bus fabric is reserved for each master, while ensuring that each master does not exceed this fixed amount by limiting the maximum bandwidth consumed by each master. This avoids scheduling conflicts and promotes efficient access to the DRAM devices from the rate limited masters. If a new master is added to such a system that passes only through a rate unlimited segment of the bus fabric, such as bus segment M, it can consume too much bandwidth on the bus fabric and or degraded performance of the other masters which were designed with the expectation of having a fixed amount of reserved bandwidth. Thus, it will be appreciated that, while the rate limiters enforce some scheduling control, since no rate limiters are configured on bus segments M, DRAM requests passing through the rate-unlimited bus segments M in particular can benefit from the priority class and fine grained QoS scheduling applied by the scheduling multiplexer 24, which in turn will prevent inadvertent consumption of the reserved bandwidth by masters connected through bus segment M. This may improve the performance of all masters.

Figure 4:
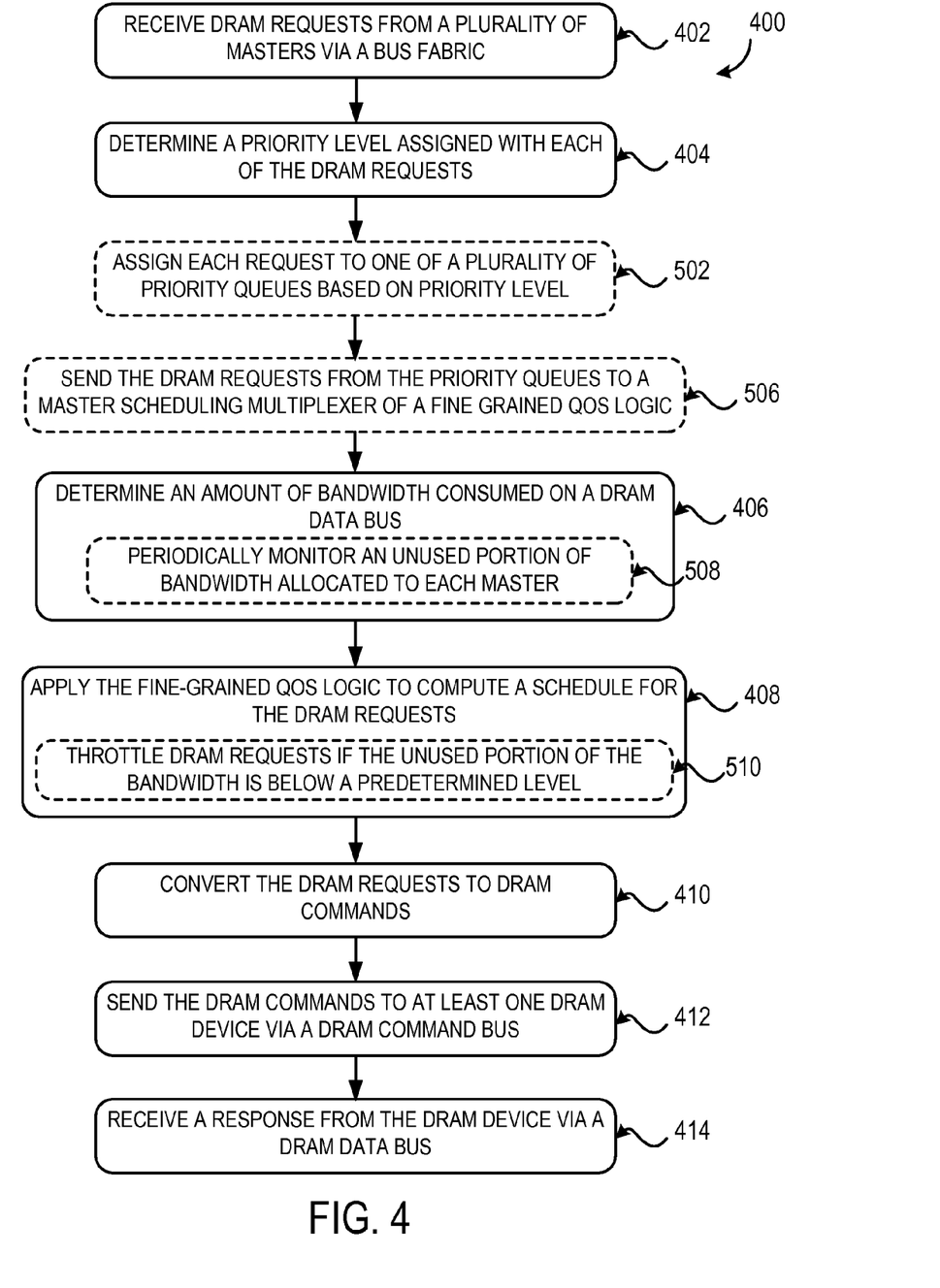
FIG. 4 is a flowchart of a method for performing fine-grained bandwidth provisioning in a DRAM memory controller, according to one embodiment.

Turning now to FIG. 4, a flowchart of a method 400 for performing fine-grained bandwidth provisioning in a memory controller is depicted. The methods described hereafter may be implemented on the hardware of system 10, described above with references to FIGS. 1 and 2, or on other suitable hardware. It will be appreciated that suitable hardware on which the methods described herein may be performed include laptop and desktop personal computers, smartphones, video games consoles, tablet computing devices, smart televisions, etc. In some implementations of the method, the steps in FIG. 4 in dashed lines may be omitted, while in other implementations, the steps in dashed lines are included.

The method 400 may include at 402 receiving dynamic random access memory (DRAM) requests from a plurality of masters via a bus fabric. At 404, the method 400 may include determining a priority level assigned with each of the DRAM requests.

Figure 5:
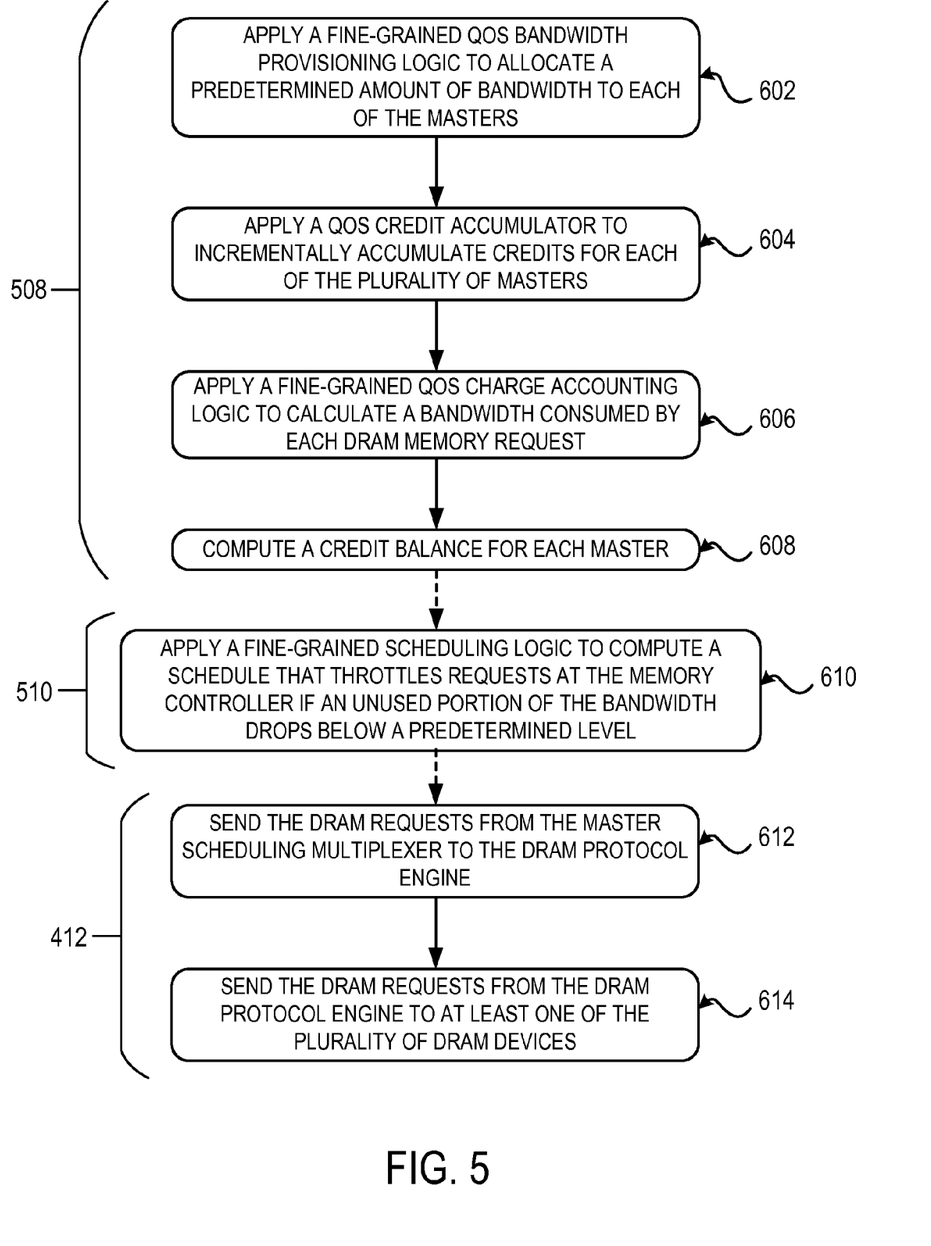
FIG. 5 is a flowchart illustrating substeps by which steps of the method of FIG. 4 can be accomplished.

At 502, the method 400 may include assigning each DRAM request to one of a plurality of priority queues based on the priority level.

At 506, the method 400 may include sending the DRAM requests to a master scheduling multiplexer.

At 406, the method 400 may include determining an amount of DRAM data bus bandwidth consumed by each master on a DRAM data bus. At 508, it is shown that this may be accomplished at least in part by periodically monitoring an unused portion of bandwidth allocated to each master.

At 408, the method 400 may include applying a fine-grained quality of service (QoS) logic to compute a schedule for the DRAM requests based on a priority class assigned to each master and an amount of DRAM data bus bandwidth consumed by each master. At 510, it is shown that the schedule may be computed to throttle the DRAM requests at the memory controller if the unused portion of the bandwidth drops below a predetermined level.

At 410, based upon the schedule created at step 408, the method 400 may include converting the DRAM requests to DRAM commands. At 412, the method 400 may include sending the DRAM commands to at least one DRAM device via a DRAM command bus. At 414, the method 400 may include receiving a response from the DRAM device via a DRAM data bus.

FIG. 5 shows a flowchart illustrates example substeps by which steps 508, 510 and 412 of method 400 of FIG. 4 can be accomplished. Step 508 of method 400 may be accomplished by performing substeps 602-608. At 602, the method may include applying a fine-grained QoS bandwidth provisioning logic to allocate a predetermined amount of bandwidth in the DRAM data bus to each of the plurality of masters. At 604, the method may include applying a QoS credit accumulator to incrementally accumulate credits for each of the plurality of masters, the rate of accumulation corresponding to the bandwidth allocated to the master by the fine-grained QoS bandwidth provisioning logic, and the total credits for each master not exceeding a predetermined maximum QoS credit value. At 606, the method may include applying a fine-grained QoS charge accounting logic to calculate a bandwidth on the DRAM data bus consumed by each DRAM memory request. At 608, the method may include computing a credit balance for each master by subtracting the calculated bandwidth 48 from the credits in the QoS credit accumulator corresponding to each master.

Step 510 of method 400 may be accomplished by substep 610. As shown at substep 610, applying a fine-grained scheduling logic and throttling DRAM requests at the memory controller if an unused portion of the bandwidth drops below a predetermined level are achieved by applying a fine-grained QoS scheduling logic to schedule the DRAM requests based on the priority class of each request, and to compute the schedule so as to throttle the DRAM requests if the credit balance in the QoS credit accumulator for the master issuing the DRAM request is below a predetermined minimum QoS credit value.

Step 412 of method 400 may be accomplished by substeps 612-614. At 612, the method may include sending the DRAM requests from the master scheduling multiplexer to the DRAM protocol engine. At 614, the method may include sending the DRAM requests from the DRAM protocol engine to at least one of the plurality of DRAM devices.

Figure 6:
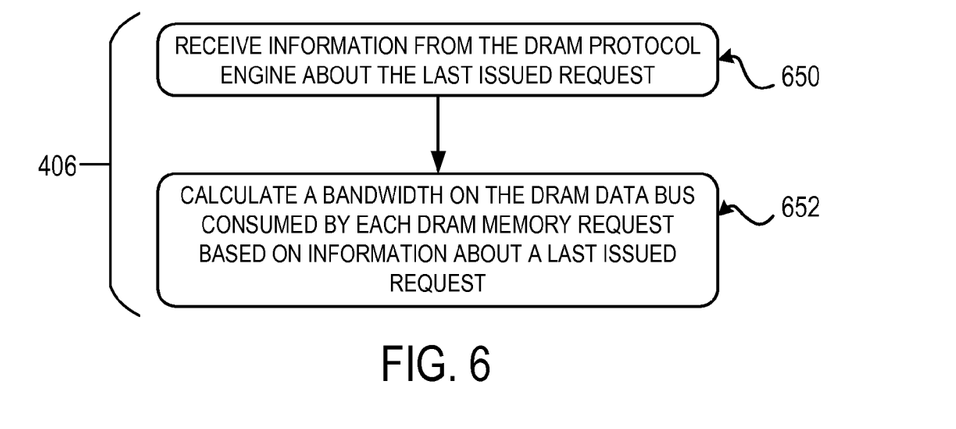
FIG. 6 is a flowchart illustrating substeps by a step of the method of FIG. 4 can be accomplished.

FIG. 6 shows a flowchart that illustrates example substeps 650, 652 by which step 406 of method 400 of FIG. 4 can be accomplished. At 650, the method may include receiving information from the DRAM protocol engine about the last issued request. At 652, the method 601 may include calculating a bandwidth on the DRAM data bus consumed by each DRAM memory request based on information about a last issued request.

Briefly turning back to FIG. 1, system 10 may also be used to model the performance of one or more software programs that were originally designed to run on a different system with less total memory bandwidth than system 10. To do so, a portion of the requests 14 from the masters 16 may be tagged as resulting from the execution of these programs. The memory controller 12 can calculate the bandwidth and QoS that the masters 16 would receive if the programs were running on the system for which they were originally designed. Using this calculation, the memory controller 12 can then allocate bandwidth and QoS to the requests 14 on system 10. Thus, the computing device may be further configured to tag a portion of the memory requests from the plurality of masters as resulting from an execution of one or more software programs originally designed to run on a system with less total memory bandwidth than the computing device, and to calculate a bandwidth and a quality-of-service (QoS) the plurality of masters would receive if the one or more software programs were running on the system with less total memory bandwidth. Further, the computing device may be configured to allocate the bandwidth and the QoS to the memory requests from the plurality of masters; and, as a result, and model a performance of the one or more software programs on the system with less total memory bandwidth.

The systems and methods described above have various useful industrial applications. For example, a first application is to allow a faster memory type to yield the same bandwidth variation as a slower memory type. For example, the system may be a video game console designed using, for example, Double Data Rate 3 (DDR3) memory running at a clock frequency of 2133 Mbps. During the lifecycle of the video game console, it may be advantageous (e.g. for performance or cost reasons) to change the memory to, for example, Double Data Rate 4 (DDR4) running at a clock frequency of 2400 Mpbs. If such a change is made during the lifecycle of a video game console, there is a risk that software designed for use with DDR3 will not run properly with DDR4. However, the fine-grained QoS logic, as described above, can enable the amount of bandwidth on the DRAM data bus to be provisioned to each master device such that the provisioning with DDR4 is the same as it was with DDR3. Thus, the fine-grained QoS logic can restrict the a future generation of memory device, such as DDR4, such that its bandwidth variation is substantially similar to a prior generation of memory device, such as DDR3, and in doing so allow software designed for the prior generation of memory device to function on a system using a later generation of memory device without experiencing additional bandwidth variation.

Another example a use case scenario for the systems and methods described above is to reduce the amount of bandwidth variation experienced by a master device when additional masters device are added to the system. If the system is a video game console, for example, additional masters may be added even after the console has been launched and software has been designed for it. Additional master device might undesirably introduce additional bandwidth perturbations to the system. However, the fine-grained QoS logic can be used to isolate the master devices and schedule the requests generated therefrom in a logical manner based on priority class and the fine-grained QoS parameters discussed above, thereby shielding the system from any added bandwidth perturbation that would otherwise be caused by adding new master devices. To accomplish this, the master devices can be assigned a fixed amount of bandwidth on the DRAM data bus and, so long as there is adequate bandwidth to support all the master devices, the bandwidth assigned to each master will remain unchanged even when new masters are added. This results in a significant reduction in the amount of testing needed to ensure that the master device will behave in the same manner as before the additional masters were added. In such an application, the fine-grained QoS logic is used to reserve a fixed amount of bandwidth for each of the master devices in the system, and to use priority class and fine grained QoS techniques to limit the bandwidth consumed by the new master from interfering with the fixed reserved bandwidths of the existing masters.

A third example is to use the systems and methods described above to partition a physical DRAM device into many logically independent DRAM devices. Master devices can be assigned to these logically independent DRAM devices and thereby be shielded from the bandwidth perturbation caused by other master devices assigned to the other partitions. Once such a partition is made, master devices can be added and removed without disturbing the master devices on the other partitions.

It will be appreciated that the systems and methods above described in the context of DRAM memory devices may also be applied to other types of memory devices, including static random access memory (SRAM), FLASH memory, magnetic disc memory, tape memory, and other kinds of volatile and non-volatile memory devices. Thus, the DRAM data bus described above may be a memory data bus, the DRAM memory requests described above may be memory requests, the DRAM commands described above may be memory commands, and the DRAM command bus described above may be a memory command bus, these various memory components being configured to operate with a particular type of memory device, such as those listed above in this paragraph.

Figure 7:
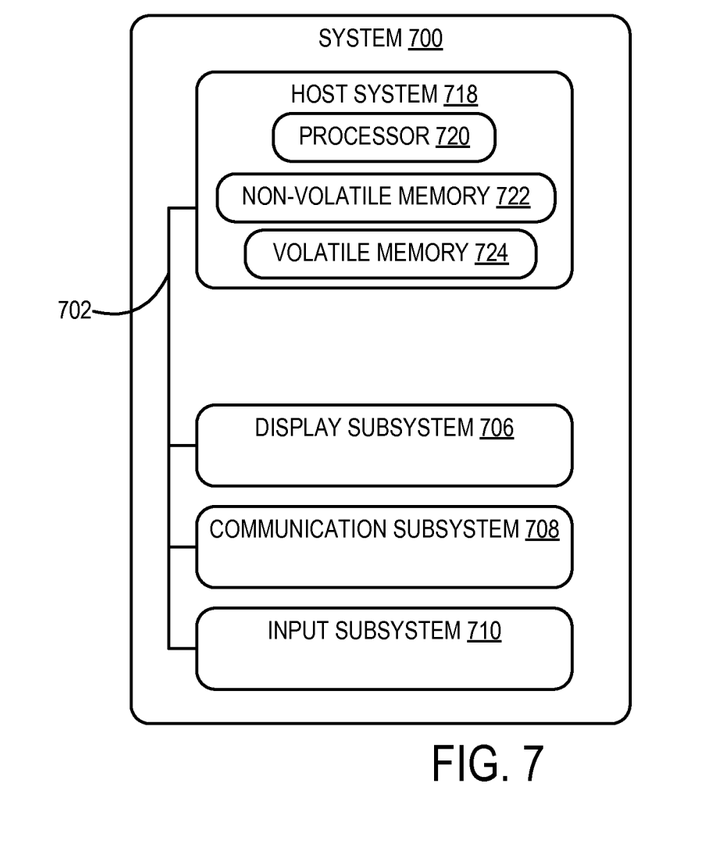
FIG. 7 is a schematic view showing additional components of the system.

FIG. 7 illustrates the computing environment in which the above described systems and methods may be implemented. As illustrated in FIG. 7, computing system 700 may include not only host system 718 with a processor 720, non-volatile memory 722 and volatile memory 724, but also may include a display subsystem 706, communication system 708, and input subsystem 710, all linked by a communications bus subsystem 702.

System 10 may take the form of one or more personal computers, server computers, tablet computers, home-entertainment computers such as a cable set top box, digital video recorder, video server etc., network computing devices, gaming devices such as a game console, mobile computing devices, mobile communication devices (e.g., smart phone), and/or other computing devices.

The processor 720 of the host system 718 is a physical device configured to execute instructions using portions of non-volatile memory 722 and the volatile memory 724. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Non-volatile memory 722 includes one or more physical devices configured to hold instructions executable by the processor 720. Non-volatile memory 722 may include non-volatile memory such as FLASH, EPROM, EEPROM, etc., which hold the instructions for a finite duration during processing, and which also continue to hold the instructions even when power is cut to the computing system. Volatile memory 724 may include DRAM, such as DRAM device 32 discusses above, or RAM which hold the instructions for a finite duration during processing but typically do not continue to store the instructions after the computing system is powered down.

Aspects of processor 720, permanent memory 722, and volatile memory 724, may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SoC), and complex programmable logic devices (CPLDs), for example.

A display subsystem 706 may be used to present a visual representation of data held by permanent memory 722 or volatile memory 724. This visual representation may take the form of a graphical user interface (GUI). As the herein described methods and processes change the data held by non-volatile memory 722 or volatile memory 724, and thus transform the state of the non-volatile memory 722 or volatile memory 724, the state of display subsystem 706 may likewise be transformed to visually represent changes in the underlying data. Display subsystem 706 may include one or more display devices utilizing virtually any type of technology. Such display devices may be combined with processor 720 and/or non-volatile memory 722 or volatile memory 724 in a shared enclosure, or such display devices may be peripheral display devices.

Input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Communication subsystem 708 may be configured to communicatively couple system 10 with one or more other computing devices. Communication subsystem 708 may include wired and/or wireless communication devices compatible with one or more different communication protocols. As non-limiting examples, the communication subsystem 708 may be configured for communication via a wireless telephone network, or a wired or wireless local- or wide-area network. In some embodiments, the communication subsystem may allow computing system 708 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A memory controller, configured to:
   receive memory requests from a plurality of masters via a bus fabric;

determine a priority level assigned with each of the plurality of masters;
calculate a bandwidth cost of a request based on information about a last issued request, the information about the last issued request being received from a memory device;
determine an amount of memory data bus bandwidth consumed by each master per request on a memory data bus;
apply a quality of service (QoS) logic to compute a schedule for the memory requests based on a priority class assigned to each master, the bandwidth cost of each request based on the information about the last issued request, and an amount of memory data bus bandwidth consumed by each master per request, the memory data bus bandwidth consumed by each master per request being calculated based on information about a last issued request; and
based upon the schedule,
  convert the memory requests to memory commands;
  send the memory commands to at least one memory device via a memory command bus; and
  receive a response from the memory device via the memory data bus.

2. The memory controller of claim 1, wherein the memory device is a dynamic random access memory (DRAM) device, the memory data bus is a DRAM data bus, the memory requests are DRAM memory requests, the memory commands are DRAM memory commands, and the memory command bus is a DRAM command bus, the memory controller being further configured to:
assign each DRAM request to one of a plurality of priority queues based on the priority level; and
schedule the DRAM requests in each of the plurality of priority queues.

3. The memory controller of claim 2, further configured to:
send the DRAM requests to a master scheduling multiplexer;
periodically monitor an unused portion of bandwidth allocated to each master; and
throttle DRAM requests at the memory controller if unused portion of the bandwidth drops below a predetermined level.

4. The memory controller of claim 3, wherein the master scheduling multiplexer applies the QoS logic, including a QoS bandwidth provisioning logic configured to allocate a predetermined amount of bandwidth in the DRAM data bus to each of the plurality of masters.

5. The memory controller of claim 4, wherein the QoS logic includes a QoS credit accumulator, configured to incrementally accumulate credits for each of the plurality of masters, the rate of accumulation corresponding to the bandwidth allocated to the master by the QoS bandwidth provisioning logic, and the total credits for each master not exceeding a predetermined maximum QoS credit value.

6. The memory controller of claim 5, wherein the QoS logic includes a QoS charge accounting logic configured to calculate a bandwidth on the DRAM data bus consumed by each DRAM memory request based on information about a last issued request, and compute a credit balance for each master by subtracting the calculated bandwidth from the credits in the QoS credit accumulator corresponding to each master.

7. The memory controller of claim 6, wherein the QoS logic includes a QoS scheduling logic, configured to schedule the DRAM requests based on the priority class of each request, and to throttle the DRAM requests if the credit balance in the QoS credit accumulator for the master issuing the DRAM request is below a predetermined minimum QoS credit value.

8. The memory controller of claim 7, further comprising a DRAM protocol engine configured to receive DRAM requests from the master scheduling multiplexer, send DRAM requests to the DRAM devices via a DRAM command bus.

9. The memory controller of claim 8, wherein the protocol engine is further configured to:
receive a response from the DRAM devices; and
send information about the last issued request to the QoS charge accounting logic.

10. A method for performing bandwidth provisioning in a memory controller, comprising:
receiving memory requests from a plurality of masters via a bus fabric;
determining a priority level assigned with each of the memory requests;
calculating the bandwidth cost of a request based on information about a last issued request, the information about the last issued request being received from a memory device;
determining an amount of memory data bus bandwidth consumed by each master per request on a memory data bus;
applying a quality of service (QoS) logic to compute a schedule for the memory requests based on a priority class assigned to each master, the bandwidth cost of each request based on the information about the last issued request, and an amount of memory data bus bandwidth consumed by each master per request, the memory data bus bandwidth consumed by each master per request being calculated based on information about a last issued request; and
based upon the schedule,
  converting the memory requests to memory commands;
  sending the memory commands to at least one memory device via a memory command bus; and
  receiving a response from the memory device via a memory data bus.

11. The method of claim 10, wherein the memory device is a dynamic random access memory (DRAM) device, the memory data bus is a DRAM data bus, the memory requests are DRAM memory requests, the memory commands are DRAM memory commands, and the memory command bus is a DRAM command bus, the method further comprising:
assigning each DRAM request to one of a plurality of priority queues based on the priority level.

12. The method of claim 11, further comprising:
sending the DRAM requests from the plurality of priority queues to a master scheduling multiplexer;
periodically monitoring an unused portion of bandwidth allocated to each master; and
computing the schedule so as to throttle the DRAM requests at the memory controller if the unused portion of the bandwidth drops below a predetermined level.

13. The method of claim 12, wherein periodically monitoring an unused portion of bandwidth allocated to each master includes applying a QoS bandwidth provisioning logic to allocate a predetermined amount of bandwidth in the DRAM data bus to each of the plurality of masters.

14. The method of claim 13, periodically monitoring an unused portion of bandwidth allocated to each master includes applying a QoS credit accumulator to incrementally accumulate credits for each of the plurality of masters, the rate of accumulation corresponding to the bandwidth allocated to the master by the QoS bandwidth provisioning logic, and the total credits for each master not exceeding a predetermined maximum QoS credit value.

15. The method of claim 14, wherein periodically monitoring an unused portion of bandwidth allocated to each master includes:
applying a QoS charge accounting logic to calculate a bandwidth on the DRAM data bus consumed by each DRAM memory request; and
computing a credit balance for each master by subtracting the calculated bandwidth from the credits in the QoS credit accumulator corresponding to each master.

16. The method of claim 15, wherein calculating the bandwidth on the DRAM data bus consumed by each DRAM memory request includes calculating the bandwidth cost of a request based on the information about a last issued request.

17. The method of claim 16, wherein applying a scheduling logic and throttling DRAM requests at the memory controller if an unused portion of the bandwidth drops below a predetermined level are achieved by applying a QoS scheduling logic to schedule the DRAM requests based on the priority class of each request, and to compute the schedule so as to throttle the DRAM requests if the credit balance in the QoS credit accumulator for the master issuing the DRAM request is below a predetermined minimum QoS credit value.

18. The method of claim 17, wherein sending the DRAM requests to at least one of a plurality of DRAM devices includes:
sending the DRAM requests from the master scheduling multiplexer to a DRAM protocol engine; and
sending the DRAM requests from the DRAM protocol engine to at least one of the plurality of DRAM devices.

19. The method of claim 18, wherein calculating the bandwidth cost of a request based on the last issued request includes receiving information from the DRAM protocol engine about the last issued request.

20. A computer readable media device configured to store program instructions in a non-volatile manner, which upon execution by the computing device, cause the computing device to:
receive memory requests from a plurality of masters via a bus fabric;
determine a priority level assigned with each of the plurality of masters;
calculate the bandwidth cost of a request based on information about a last issued request, the information about the last issued request being received from a memory device;
determine an amount of memory data bus bandwidth consumed by each master per request on a memory data bus;
apply a quality of service (QoS) logic to compute a schedule for the memory requests based on a priority class assigned to each master, the bandwidth cost of each request based on the information about the last issued request, and an amount of memory data bus bandwidth consumed by each master per request; and
based upon the schedule,
convert the memory requests to memory commands;
send the memory commands to at least one memory device via a memory command bus; and
receive a response from the memory device via a memory data bus;
tag a portion of the memory requests from the plurality of masters as resulting from an execution of one or more software programs originally designed to run on a system with less total memory bandwidth than the computing device;
calculate a bandwidth and a quality-of-service (QoS) the plurality of masters would receive if the one or more software programs were running on the system with less total memory bandwidth;
allocate the bandwidth and the QoS to the memory requests from the plurality of masters; and, as a result,
model, on the computing device, a performance of the one or more software programs on the system with less total memory bandwidth.

* * * * *